United States Patent [19]

Oota

[11] 4,406,217
[45] Sep. 27, 1983

[54] COFFEE MAKER

[75] Inventor: Hiroyuki Oota, Iwakura, Japan

[73] Assignee: Tokyo Shibaura Denki Kabushiki Kaisha, Kawasaki, Japan

[21] Appl. No.: 335,288

[22] Filed: Dec. 28, 1981

[30] Foreign Application Priority Data

Dec. 27, 1980 [JP] Japan .............................. 55/185764
Dec. 29, 1980 [JP] Japan .............................. 55/187392

[51] Int. Cl.³ .......................................... A47J 31/42
[52] U.S. Cl. ................................... 99/280; 99/282; 99/285; 99/286; 219/302
[58] Field of Search ............... 99/286, 280, 281, 282, 99/284, 285, 288, 198, 300, 304, 307, 287; 307/141.4, 141.8; 318/484; 219/297, 302

[56] References Cited

U.S. PATENT DOCUMENTS

| 2,868,109 | 1/1959 | Davis | 99/286 |
| 4,133,256 | 1/1979 | Lamour | 99/280 |
| 4,196,658 | 4/1980 | Takagi | 99/286 |
| 4,223,379 | 9/1980 | Simcoe | 307/141.4 |
| 4,242,568 | 12/1980 | Wunderlin | 99/280 |
| 4,328,539 | 5/1982 | Heeger | 307/141.4 |

FOREIGN PATENT DOCUMENTS 55-42615  3/1980  Japan.

Primary Examiner—Robert W. Jenkins
Attorney, Agent, or Firm—Cushman, Darby & Cushman

[57] ABSTRACT

A coffee maker is provided with a mill mechanism, a drip mechanism and a control device. The control device contains a mill time setting counter for setting a milling time of coffee beans in the form of digital data, a drive circuit for driving the mill mechanism and a drive circuit for driving the drip mechanism. When a start signal is supplied to the control device, the mill mechanism is driven only for the milling time set. After the lapse of the milling time, the drip mechanism is automatically actuated to brew coffee.

12 Claims, 6 Drawing Figures

COFFEE MAKER

BACKGROUND OF THE INVENTION

The present invention relates to a coffee maker with a mill mechanism for milling coffee beans contained in a case into coffee powder and a drip mechanism for pouring hot water to the coffee powder to extract coffee. A combination type coffee maker of a drip mechanism (pot) with a mill mechanism is disclosed in U.S. Pat. No. 4,196,658 issued to Takagi et al. on Apr. 8, 1980 which is assigned to the same assignee as of this application. Since the mill mechanism in such a coffee maker may be operated to mill coffee beans into coffee powder immediately before the drip mechanism pours water into the coffee powder to extract coffee, the coffee maker has the advantage of preventing the coffee powder from being wet and losing a flavor of coffee.

The coffee mill mechanism includes a cutter coupled with a motor so that a grain size of coffee powder depends on a length of driving time of the motor. Therefore, the coffee mill mechanism is generally designed such that, to adjust a desired grain size of the coffee powder, the motor driving time may be set by a manual switch or a spring driven timer. The former approach by the manual switch, however, has a defect that, since the mill time or the motor driving time is set depending on the intuition of an operator, the setting of the mill time is instable. In the later approach, the time setting operation for the spring driven timer is likely to be inaccuracy, thus resulting in an unfixed mill time. This problem may be solved if the rotating time of the cutter is controlled in response to digital data once set, and the drip process is started immediately after the coffee beans are milled.

SUMMARY OF THE INVENTION

Accordingly, an object of the present invention is to provide a coffee maker with a mill mechanism and a drip mechanism, in which the mill mechanism is accurately operated for a desired time in response to a preset digital data and the drip mechanism is operated in response to the end of operation of the mill mechanism.

A coffee maker according to the present invention comprises: a mill mechanism for milling coffee beans contained in a case into coffee powder; a drip mechanism for pouring hot water to the case and extracting coffee from the coffee powder, the drip mechanism including a heater for heating water; means for setting an operation period of time of the mill mechanism in the form of digital data; means for driving the mill mechanism in accordance with the operation period of time set in the setting means; means for storing drip-sequence data of the mill mechanism; and means for controlling the activation of the heater in response to the drip-sequence data stored in the storing means.

DETAILED DESCRIPTION OF THE PREFERRED EMBODIMENTS

Figure 1:
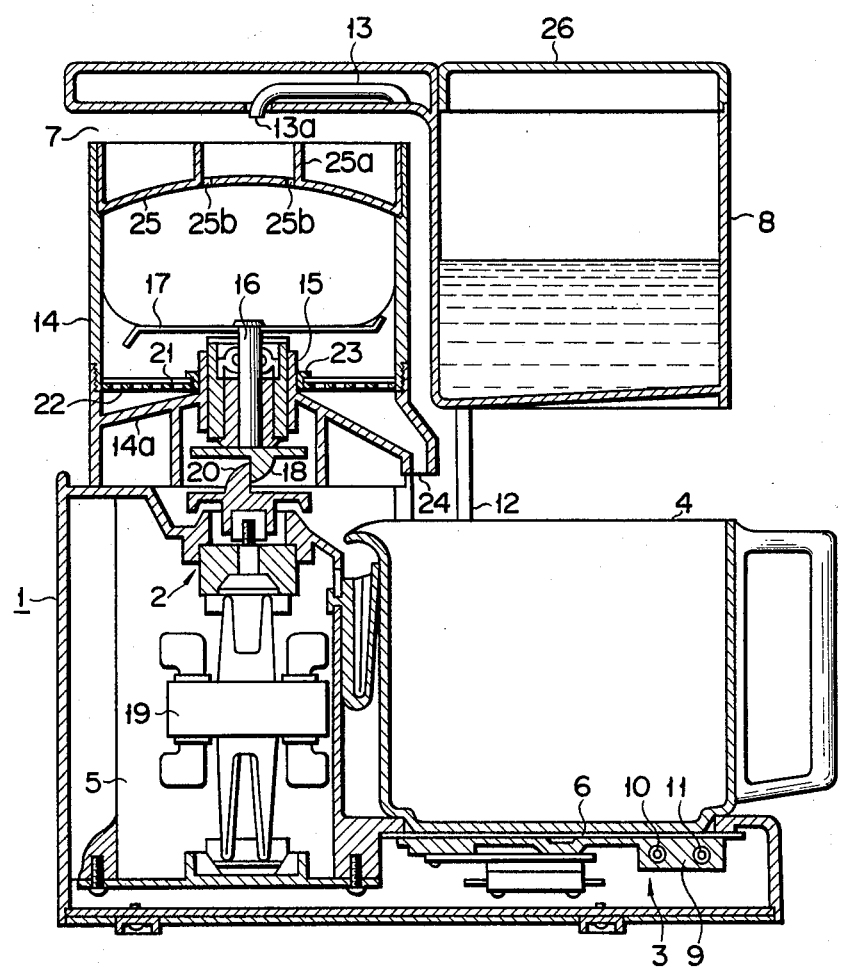
FIG. 1 shows a longitudinal sectional view of an embodiment of a coffee maker according to the present invention.

An overall construction of a coffee maker according to the present invention will be described referring to FIGS. 1 and 2. In the figures, a housing 1 contains a mill mechanism 2 for milling coffee beans into coffee powder, a drip mechanism 3, as a hot water feed mechanism, for dripping hot water into the coffee powder to brew coffee, and a container 4, or a bottle, for reserving coffee. A motor container 5 and a bottle table 6 are disposed on both sides of the lower part of the housing 1. A case loading section 7 and a reservoir tank 8 are disposed on both sides of the upper part of the housing 1. A heater plate 9, provided in an intimate contact with the lower surface of the bottle table 6, is provided with an electrical heater, e.g. a sheathed heater 10, and a heating pipe 11 which are buried therein in a parallel arrangement. One end of the heating pipe 11 is upwardly extended to form a water feed pipe 12 connecting to a water outlet (not shown) of the reservoir tank 8. The other end of the heating pipe 11 is upwardly extended to form a hot water feed pipe 13 of the case loading section 7. A case 14, loaded into the case loading section 7, is provided in common for both the mill mechanism 2 and the drip mechanism 3. A drive shaft 16 is rotatably and water-tightly inserted into a shaft tube 15 formed at the central portion of a bottom wall 14a of the case 14. A cutter 17 for milling coffee beans is provided in the upper part of the drive shaft 16. A joint 18, provided in the lower part of the shaft 16, is coupled with a joint 20 of a motor 19 disposed in the motor container 5. A filter 21 is mounted under the cutter 17 by means of a frame-shaped filter support 2 and a water-tight member 23 to receive the coffee powder milled by the cutter 17. An extraction 24 formed in a bottom wall 14a of the case 14 is opened into the upper end opening of the bottle 4 removably placed on the bottle table 6. A cover 25 is removably mounted at the upper end opening of the case 14. The cover 25 has a tubular wall 25a upstanding at the substantially central portion of the cover and hot water pour-in holes 25b are formed within the tubular wall 25a. A port 13a at the distal end of the hot water feed pipe 13 is opened into the tubular wall 25a from the above. A cover 26 as a part of the housing 1 is removably mounted at the upper end opening of the reservoir tank 8.

Figure 2:
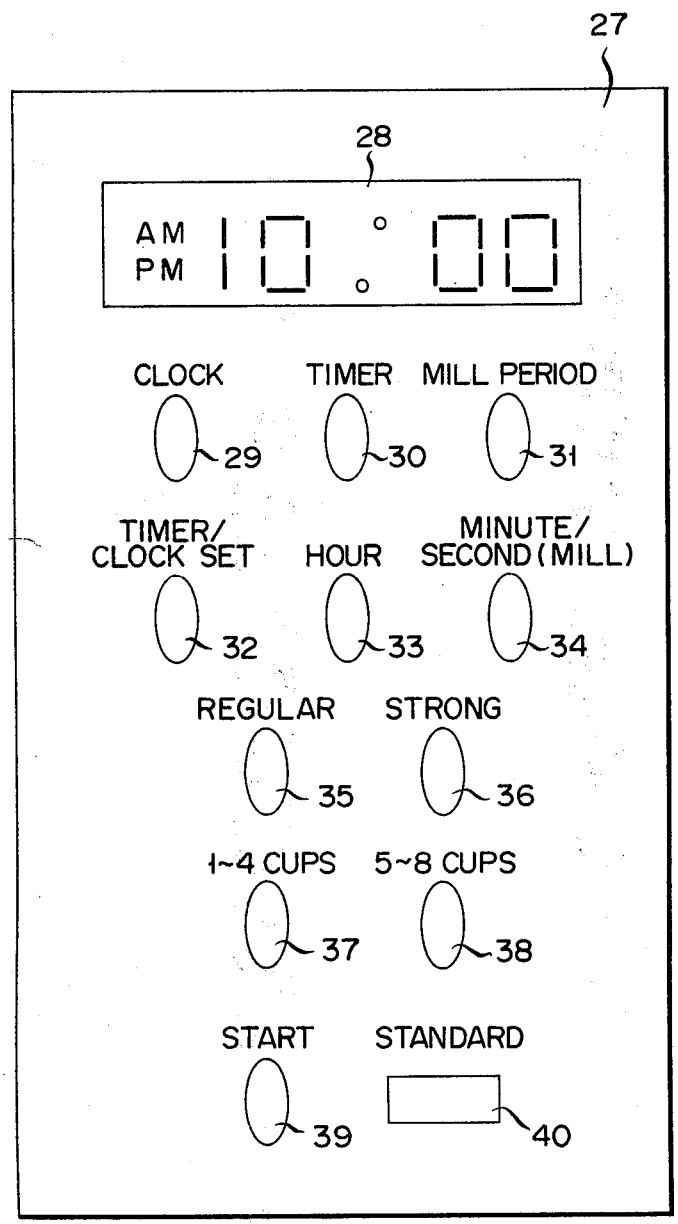
FIG. 2 shows a control panel arrangement mounted to the coffee maker shown in FIG. 1.

Turning now to FIG. 2, there is shown an operation panel attached to the housing 1. A variety of controls and knobs are contained on the operation panel; a digital display device 28, a clock switch 29, a timer switch 30, a mill time set switch 31, a timer/clock set switch 32, an "hour" data set switch 33, a "minute/second" data set switch 34, a regular coffee set switch 35, a strong coffee set switch 36, a small volume (one to four cups) set switch 37, a large volume (five to eight cups) set switch 38, a start switch 39 and a standard operation switch 40.

Figure 3:
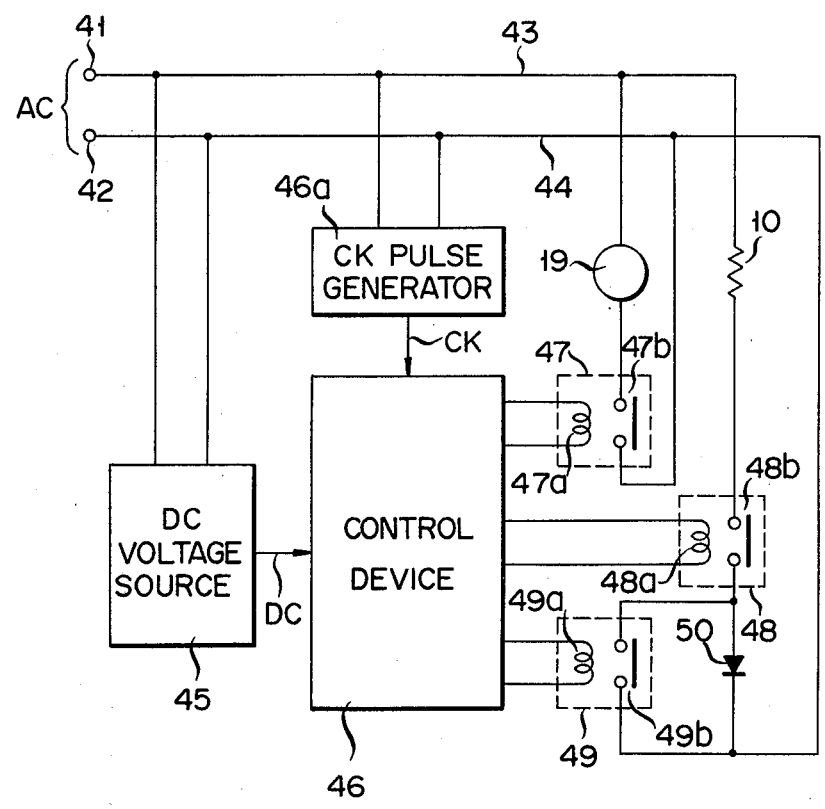
FIG. 3 shows a block diagram of an electronic circuit used in the coffee maker shown in FIG. 1.

An electrical arrangement of the coffee maker will be described referring to FIG. 3. Reference numerals 41 and 42 designate AC power source terminals with which power lines 43 and 44 are coupled. Reference numeral 45 designates a DC power source circuit connected between power lines 43 and 44. A DC voltage from the DC power source circuit is applied to a control device 46 which may be comprised of a microcomputer, a drive circuit, etc., as will be described later. A clock pulse (CK) generator 46a is connected between these lines 43 and 44, and the clock pulses at "one second" period, for example, are applied to the control device 46 as time base signals. Reference numerals 47, 48 and 49 designate a relay for the motor 19, an ON/-OFF control relay for the heater 10 and a power control relay of the heater 10, which have exciting coils 47a, 48a and 49a which are fed with current in response to a command signal of the control device 46 as described later referring to FIG. 3, and normally open contacts 47b, 48b and 49b, respectively. Further, a series circuit of the motor 19 and the normally open contact 47b, and a series circuit of the sheathed heater 10, the normally open contact 48b and a diode 50 are connected between the power lines 43 and 44. A thermal switch such as a bimetal switch and a thermal fuse may be provided in the series circuit of the heater 10, the contact 48b and the diode 50. The normally open contact 49b is connected to the diode 50 in parallel. The sheathed heater 10 has a calorific value corresponding to 800 W, for example, when the heater 10 is energized with full-wave alternative current supplied from the AC power source of 100 V. Accordingly, when the sheathed heater 10 is fed with half-wave alternative current through the diode 50, it has a calorific value corresponding to 400 W.

An arrangement of the control device 46 will be described further referring to FIG. 4. Reference numeral 51 indicates a mill time setting counter. A start signal S39 from a start switch 39, a mill time set signal S31 from the mill time set switch 31 and a "second" data set signal S34 from the "minute/second" data set switch 34, which are generated when these switches are turned on, are applied to input terminals Ia, Ib and Ic of the counter 51, respectively. A standard operation signal S40 produced from the standard operation switch 40 when the switch 40 is depressed, is applied to another input terminal Id of the mill time setting counter 51. A further input terminal Ie of the counter 51 is supplied with a drive signal S52 from an output terminal O of a timer/clock counter 52. In the counter 52, input terminals Ia, Ib, Ic and Id are respectively supplied with an "hour" data set signal S33, a "minute/second" data set signal S34, a timer signal S30, and a timer/clock set signal S32 generated from the "hour" data set switch 33, the "minute/second" data set switch 34, and the timer switch 30 and the timer/clock set switch 32 when these switches are turned on. The mill time setting counter 51 starts the counting operation when receives one of the start signal S39, the standard operation signal S40, and the drive signal S52. Simultaneously, it produces an operation start signal S51a from the output terminal Oa. Upon the completion of the count operation, it produces an operation stop signal S51b from the output terminal Ob. When the mill time setting counter 51 receives a "second" data set signal S34 from the "minute/second" data set switch 34 after receiving the mill time set signal S31 from the mill time set switch 31, a mill (operation) period of time is set in the mill time setting counter 51 at one second intervals in the form of "second" such as "1", "2", "3", ... so long as the mill time setting counter 51 receives the "second" data set signal S34. The mill period of time set in the mill time setting counter 51 is displayed on the "minute/second" part of display device 28 (FIG. 2). The timer/clock counter 52 is provided with a timer section for setting timer data to start the mill mechanism and a clock section for setting the current time. In setting the timer data, when the timer/clock counter 52 is supplied with a "minute" data set signal S34 from the "minute/second" data set switch 34, following a timer signal S30 from the timer switch 30, the "minute" data such as "1", "2", "3", ..., is set in the form of "minute" unit at one-second interval during the period of time that it receives the "minute" data set signal S34. The set time is displayed on the "minute/second" part of the display device 28. Similarly, an "hour" data such as "1", "2", "3", ..., is set in the form of "hour" unit in the counter 52 at one-second intervals during a time period that it receives the "hour" data set signal S33 from the "hour" data set switch 33. The set "hour" data is displayed on the "hour" part of the display device 28. In the clock section, the current time (hour and minute) is set by using the clock switch 29 (not shown in FIG. 4) instead of the timer switch 30 in the same manner as the timer section. Then, when receiving a timer/clock set signal S32 from the timer/clock set switch 32, the timer/clock counter 52 starts the count operation (time counting operation) from the current time of "hour" and "minute" set in the clock section. The counter 52 performs the count operation and produces a start command signal S52 from its output terminal O when the current time in the clock section is coincident with the timer data set in the timer section. A mill drive circuit 53 receives at input terminals Ia and Ib an operation start signal S51a and an operation stop signal S51b from the mill time setting counter 51. In response to the operation start signal S51a, it feeds current from the output terminal O to the exciting coil 47a of the motor relay 47. In response to the operation stop signal S51b, it shuts off the current feed to the exciting coil 47a. A drip sequence memory 54 for storing data indicative of regular and strong coffee drip sequence, as shown in FIGS. 5A and 5B, has input terminals Ia, Ib, Ic and Id, and output terminals Oa and Ob. The operation stop signal S51b is also applied to the input terminal Ia of the memory 54. The standard operation signal S40 is supplied to the input terminal Ib. A regular coffee set signal S35 which is produced, when the regular coffee set switch 35 is turned on, is applied to the input terminal Ic. A strong coffee set signal S36 which is produced, when the strong coffee set switch 36 is turned on, is applied to the input terminal Id. When receiving the standard operation signal S40 and the regular coffee set signal S35, the memory 54 reads out data indicative of the regular coffee drip sequence shown in FIG. 5A. When receiving the strong coffee set signal S36, it reads out data indicative of the strong coffee drip sequence shown in FIG. 5B. Then, when receiving the operation stop signal S51b, the memory 54 provides an ON signal S54a or an OFF signal S54b at the output terminal Oa or Ob in accordance with the drip sequence data set by the set switches 35 and 36, respectively. A heater ON/OFF control circuit 55 for the heater relay 48 has input terminals Ia and Ib which respectively receive the ON and OFF signals S54a and S54b. When supplied with the ON signal S54a, the control circuit 55 feeds current to the exciting coil 48a of the heater relay 48 through an output terminal O. When supplied with the OFF signal, the exciting coil 48a is shut off. A heater power control circuit 56 for the heat capacity changeover relay 49 receives at the input terminal Ia the standard operation signal S40, at the input terminal Ib a small volume set signal S37 generated when the small volume set switch 37 is turned on and at the input terminal Ic a large volume set signal S38 generated when the large volume set switch 38 is turned on. When receiving the small volume set signal S37, the heater power control circuit 56 supplies current through the output terminal O to the exciting coil 49a of the relay 49. When receiving the standard operation signal S40 and the large volume set signal S38, the control circuit 56 stops the current supply to the exciting coil 49a.

The operation of the embodiment as mentioned above will be described hereinafter.

A case where regular coffee of a fixed amount (e.g. 8 cups) is prepared will first be described. Eight cups of water (for eight persons) is poured into the reservoir tank 8 and coffee beans with the amount corresponding to the eight cups coffee is set in the case 14. Then, the standard operation switch 40 is depressed to produce a standard operation signal S40. Upon receipt of the standard operation signal S40, the mill time setting counter 51 starts to count a fixed period of time (e.g. 13 seconds) while at the same time generates an operation signal S51a for transmission to the relay drive circuit 53. Then, the mill drive circuit 53 feeds current into the exciting coil 47a of the relay 47. The relay 47 closes the normally open contact 47b to allow the current to flow into the motor 19 of the mill mechanism 2. The motor 19 is driven to rotate the cutter 17 so as to mill all the coffee beans within the case 14. That is, the milling process starts. Meanwhile, the drip sequence memory 54, when it receives the standard operation signal S40, reads out data indicative of a regular drip sequence shown in FIG. 5A. Similarly, the heater power control circuit 56, when it receives the standard operation signal S40, feeds current to the exciting coil 49a of the heat capacity changeover relay 49 to close the normally open contact 49b. Accordingly, the diode connected in series with the sheathed heater 10 is shorted by the normally open contact 49b. Then, the mill time setting counter 51 completes the count operation of the fixed period of time (e.g. 13 seconds). At this time, the mill time setting counter 51 generates an operation stop signal S51b of the motor relay drive circuit 53. The mill drive circuit 53 shuts off the current to the exciting coil 47b, to thereby restore the relay 47. At this point, the milling process ends. Since the operation stop signal S51b is applied to the drip sequence memory 54, the memory 54 reads out the data indicative of the regular coffee drip sequence as shown in FIG. 5A. In the drip process on the basis of the regular coffee drip sequence, the ON signal S54a is continuously produced and applied to the heater ON/OFF control circuit 55 for the heater relay 48, to continuously close the normally open contact 48b. As a result, the sheathed heater 10 is fed with current to generate a large capacity of heat of 800 W. When the sheathed heater 10 produces heat, the heater plate 9 is heated to preheat the bottle 4 placed on the bottle table 6. At the same time, the water in the heating pipe 11 fed from the reservoir tank 8 through the water feed pipe 12 is heated to become hot water. The vapor pressure raises the hot water through the feed pipe 13 to enter from the hot water outlet 13a into the tubular wall 25a. The hot water is dripped from the perforations 25b into the case 14. The hot water supplied into the case 14 is passed through the coffee powder and the filter 21, so that coffee is brewed. The coffee flows from the extracting outlet 24 of the case 14 to drip into the bottle 4. In this way, the sheathed heater 10 is continuously current-fed on the basis of the regular drip sequence. The hot water is continuously fed into the case 14, to thereby obtain the coffee at standard concentration, or a regular coffee. Then, the water in the reservoir tank 8 is completely consumed, and at this point the drip process is finished.

Description to follow is how to select a desired mill time, a desired drip sequence and a desired amount of coffee. Firstly, a desired number of cups of water is poured into the reservoir tank 8. Then, the coffee beans of the corresponding amount are put into the case 14. In accordance with the water amount, for example, one to four cups of water, the small volume set switch 37 is turned on to energize the heater 10 at 400 W. Alternatively, when the poured-in water is five to eight cups, the large volume set switch 38 is depressed to energize the heater 10 at 800 W. By way of example, it is assumed that, by turning on the small volume set switch 37, the small volume set signal S37 is applied to the heater power control circuit 56, shutting off the current feed to the exciting coil 49a, of the relay 49 and to open the normally open contact 49b. Further, either the regular coffee set switch 35 or the strong coffee set switch 36 is operated according to a desirable density of coffee. In this example, the strong coffee set switch 36 is turned on and a strong coffee set signal S36 is applied to the drip sequence memory 54 to select a strong coffee drip sequence shown in FIG. 5B. Then, after applying a mill time setting signal S31 to the mill time setting counter 51 by turning on the mill time set switch 31, the "minute/second" data set switch 34 is turned on to set a desired "second" data in the mill time setting counter 51. Then, the start switch 39 is turned on to produce a start signal S39, so that the mill time setting counter 51 starts the counting operation for the set period of time and generates an operation start signal S51a. As a result, the milling process starts as in the previous case. After this, when the mill time setting counter 51 completes the counting operation of the set period of time to produce an operation stop signal S51b, the milling process is finished and the operation stop signal S51b is applied to the drip sequence memory 54 to start the drip process. In other words, the drip process is controlled on the basis of a strong coffee drip sequence shown in FIG. 5B. In the process, the drip sequence memory 54 provides an ON signal S54a to feed current to the exciting coil 48a of the heater relay 48 via the heater ON/OFF control circuit 55, closing in turn a normally open contact 48b to feed current to the sheathed heater 10. In this case, since the sheathed heater 10 is conducted through a diode 50 connected thereto in series, the heater 10 generates heat at the calorific value of 400 W. Therefore, the case 14 is supplied with hot water as in the previous case. Then, when a certain time period ta (one minute, for example) lapses, the drip sequence memory 54 provides an OFF signal S54b, to shut off the current supply to the exciting coil 48a of the heater relay 48 by way of the heater ON/OFF control circuit 55 to open the normally open contact 48b. Accordingly, the sheathed heater 10 is shut off and stops the supply of boiled water to the case 14. As a result, the boiled water supplied to the case 14 by the current passage for the given period of time ta entirely percolates into the coffee powder in the case 14 to wet the coffee powder. Therefore, the extraction of an essence of coffee contained in the coffee powder is facilitated. Then, after a given time period tb (one minute, for example), the drip sequence memory 54 provides the ON signal S54a again and the normally open contact 48b of the heater relay 48 is closed. As a result, the sheathed heater 10 is energized to supply boiled water to the case 14 again. Afterwards, the drip sequence memory 54 continuously provides an ON signal S54a to close the normally open contact 48b of the heater relay 48. Therefore, the case 14 is continuously supplied with boiled water to perform the extraction of coffee. When the coffee extraction by the continuous boiled water supply is performed in accordance with the strong coffee drip sequence after the whole coffee powder is wet, the coffee brewed is stronger than the regular coffee, thus obtaining so-called strong coffee. Then, when the water in the reservoir tank 8 is completely consumed, the drip process is completed.

Now, a case that the coffee making is performed after a desirable time by using the timer/clock counter 52 will be described. A desirable milling period of time is set in the mill time setting counter 51 as in the previous way, and a desirable drip data is read out from the drip sequence memory 54. Further, the corresponding calorific value of the sheathed heater 10 is selected by the heater power control circuit 56. Then, the timer switch 30 is turned on to apply a timer signal S30 to the timer/clock counter 52 and the "minute" data set switch 34 is turned on to apply a "minute" data set signal S34 to the same, a desirable "minute" data is set in the counter 52. Similarly, the "hour" data set switch 33 is operated to provide an "hour" data set signal and a desired "hour" data is set in the counter 52. Further, the timer/clock set switch 32 is operated to provide a timer set signal S32. Consequently, the timer/clock counter 52 starts the counting operation for the set period of time. Upon completion of the time-counting operation, it produces a start command signal S52 and applies the start command signal S52 to the mill time setting counter 51. Accordingly, the mill time setting counter 51 starts the operation of counting the set milling period of time and produces the operation start signal S51a, so that the milling process is started. When the mill time setting counter 51 completes the count of the set milling period of time, it produces an operation stop signal S51b, and the milling process is finished. As the operation stop signal S51b is also applied to the drip sequence memory 54, the drip process starts. The drip sequence memory 54 provides data for controlling the ON/OFF of the sheathed heater 10 on the basis of either the regular coffee drip data or the strong coffee drip data selected. The sheathed heater 10 is heated at the calorific value 800 W or 400 W. In this way, the milling process and the drip process is performed after a lapse of a desirable time to thereby brew a desirable amount of regular or strong coffee.

When the clock switch 29 is operated, a present time stored in the clock section of the timer/clock counter 52 is displayed on the display device 8. For correcting the displayed "minute" and "hour" data, the "minute/second" data set switch 34, the "hour" data set switch 33 and the timer/clock set switch 32 are respectively operated in substantially the same manner as for setting timer data in the counter 52.

As described above, according to the embodiment of the present invention, when the standard operation switch 40 is turned on, a milling process is performed over a predetermined time period (for example, 13 seconds). Following the milling process, a drip process is performed at a predetermined calorific value of 800 W on the basis of a preset regular coffee drip sequence. As a result, a regular coffee of a large amount, for example, eight cups, is automatically obtained. Therefore, when a large amount of regular coffee is prepared for a large family, all the operator has to do is a mere push, or one-touch operation, of the standard operation switch 40. Thus, the operation of the coffee maker is very simple. Additionally, when the large amount of coffee, for example, eight cups, is prepared, the sheathed heater 10 is heated at 800 W against the 400 W for the small amount (e.g. one to four cups) coffee preparation. Therefore, no further time is consumed for the drip process.

According to the present embodiment, a desired milling period of time may be set in the mill time setting counter 51. Accordingly, the grain size of the coffee powder may properly be selected. The provision of the drip sequence memory 54 allows the operator to desirably select a regular coffee drip sequence or a strong coffee drip sequence. The provision of the heater power control circuit 56 allows the operator to desirably select the calorific value 800 W or 400 W of the sheathed heater 10. Therefore, these features of the present embodiment can make coffee of desirable flavor, concentration and amount.

Further, in the present embodiment, when a desired start time is set in the timer/clock counter 52, the coffee brewing process including the milling process and the drip process may be started at the set time. Accordingly, when the timer/clock counter 52 is set at a desired start time this evening, a desired amount of coffee of desired flavor and desired concentration can be obtained tomorrow morning. In this respect, the coffee maker according to the present invention is very convenient. Also in this case, the coffee beans are milled immediately before the drip process. Accordingly, there occurs no situation that the coffee powder is exposed to air for a longer time. Accordingly, the problem that the coffee powder gets wet to lose the flavor is eliminated.

Figure 4:
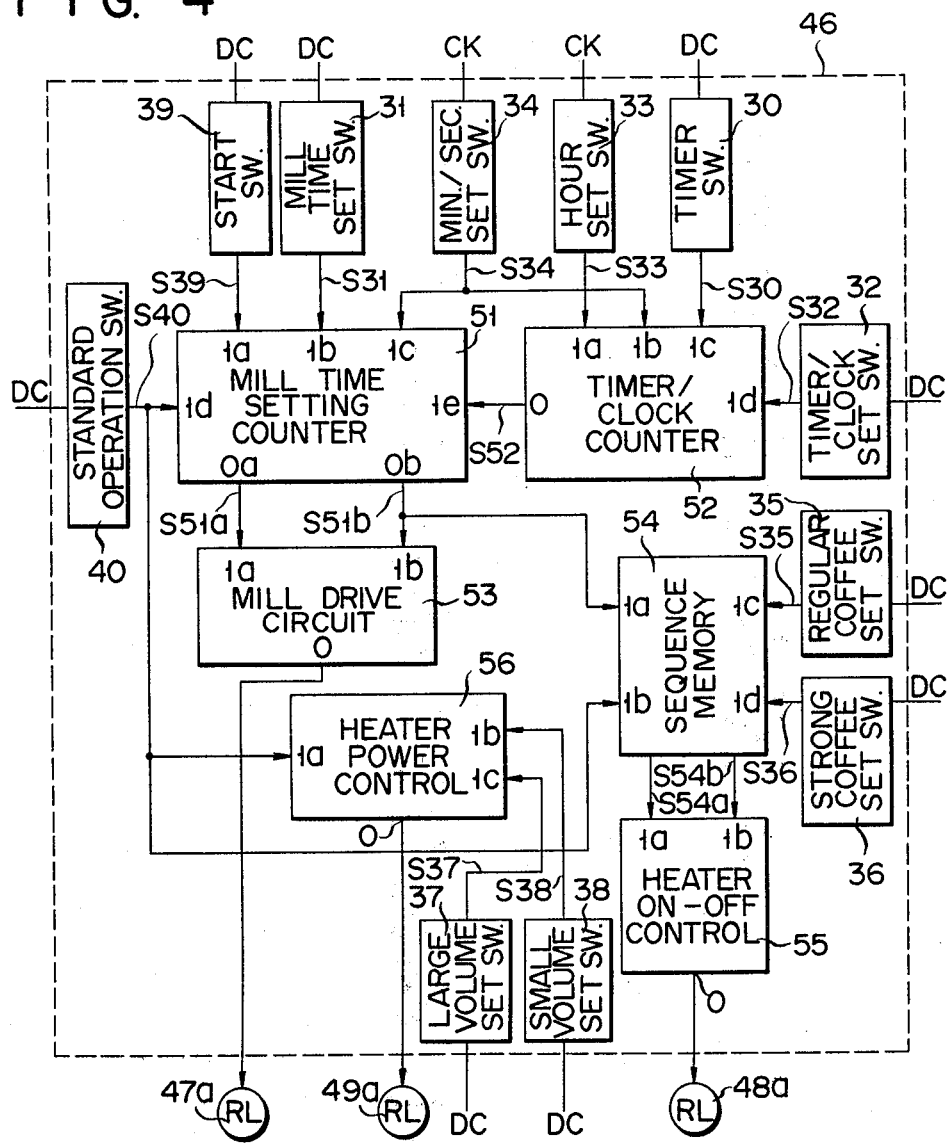
FIG. 4 shows a block diagram of a control device used in the circuit shown in FIG. 3.
Figure 5A:
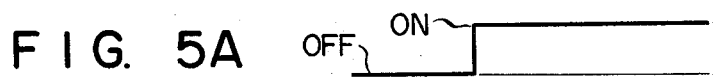
FIGS. 5A and 5B show time charts of regular and strong coffee drip sequence respectively.
Figure 5B:
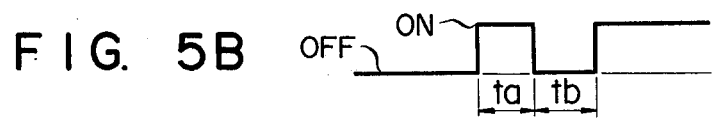

The embodiment shown in FIG. 4 may be modified such that the hot water supply follows the milling periof of time by using the mill time setting counter 51, the relay drive circuit 53 and the heater ON/OFF control circuit 55. It is evident that at least one of the timer/clock counter 52, the memory 54, and the heater power control circuit 56 is additionally provided to the circuitry of the mill time setting counter 51, the relay drive circuit 53 and the heater ON/OFF control circuit 55.

What is claimed is:

1. A coffee maker comprising:
   a mill mechanism for milling coffee beans contained in a case into coffee powder;
   a drip mechanism for pouring hot water to the case and extracting coffee from the coffee powder, said drip mechanism including a heater for heating water;
   means for setting an operation period of time of said mill mechanism in the form of digital data;
   means for driving said mill mechanism in accordance with the operation period of time set in said setting means;
   means for storing drip sequence data of said drip mechanism; and
   means for controlling the activation of said heater in response to the drip sequence data stored in said storing means.

2. A coffee maker according to claim 1, further including means for setting timer data, wherein said driving means starts driving said mill mechanism in response to the timer data set in said timer data setting means.

3. A coffee maker according to claim 1, wherein said operation period setting means includes a counter for counting the operation period of time, a start switch for providing said counter with a start signal for the counting operation, and a set switch for setting the operation period of time in said counter.

4. A coffee maker according to claim 3, wherein said operation period setting means further includes a standard operation switch for providing said counter with a standard operation signal, said counter counting a standard operation period of time upon receipt of the standard operation signal from said standard operation switch.

5. A coffee maker according to claim 1, wherein said storing means includes a regular coffee set switch, a strong coffee set switch, and a memory for storing the drip sequence data of regular coffee and strong coffee and providing said controlling means with the drip sequence data of regular and strong coffee in accordance with the operation of said regular coffee and strong coffee set switches, respectively.

6. A coffee maker according to claim 1, wherein said controlling means includes a coffee volume set switch for setting coffee volume to be served, and a heater power control means for controlling electrical power supplied to said heater in accordance with the operation of said coffee volume set switch.

7. A coffee maker according to claim 6, wherein said controlling means further includes a heater ON/OFF control means for controlling to turn on and off said heater in response to the drip sequence data.

8. A coffee maker comprising:
 a mill mechanism for milling coffee beans contained in a case into coffee powder;
 a drip mechanism for pouring hot water to the case and extracting coffee from the coffee powder, said drip mechanism including a heater for heating water;
 a counter for counting an operation period of time of said mill mechanism;
 a start switch for enabling said counter to start the counting operation;
 an operation period set switch for setting the operation period of time in said counter;
 means for driving said mill mechanism in response to the output signal of said counter during the operation period of time;
 a regular coffee set switch for producing a regular coffee set signal;
 a strong coffee set switch for producing a strong coffee set signal;
 a memory for storing drip sequence data of regular coffee and strong coffee, and reading out the drip sequence data of regular coffee and strong coffee at the timing of the counting operation of said counter in accordance with the operation of said regular coffee and strong coffee set switches, respectively; and
 means for controlling the activation of said heater in response to the drip sequence data read out from said memory.

9. A coffee maker according to claim 8, further including timer means for setting timer data, wherein said counter automatically starts the counting operation in response to the timer data set in said timer means.

10. A coffee maker according to claim 9, wherein said timer means includes a clock counter for counting current clock data, a timer counter for counting timer data, an hour data set switch for setting hour data in said clock counter and said timer counter, and a minute data set switch for setting minute data in said clock counter and said timer counter.

11. A coffee maker according to claim 8, wherein said controlling means includes a coffee volume set switch for setting coffee volume to be served, a heater power control means for controlling electrical power supplied to said heater in accordance with the operation of said coffee volume set switch, and a heater ON/OFF control means for controlling to turn on and off said heater in response to the drip sequence data read out from said memory.

12. A coffee maker according to claim 11, further including a standard operation switch for producing a standard operation signal, wherein said counter counts a standard operation period of time upon receipt of the standard operation signal, said memory reads out the drip sequence data of regular coffee in response to the standard operation signal, and said heater power control means provides said heater with the electrical power necessary for heating a standard operation volume of the water in accordance with the standard operation signal.

* * * * *